United States Patent Office 3,024,207
Patented Mar. 6, 1962

3,024,207
ION-EXCHANGE PRODUCTS AND METHODS
FOR MAKING AND USING THEM
Robert S. Shaw, Philadelphia, and Robert P. Hopkins, Ardsley, Pa., assignors to Rohm & Haas Company, Philadelphia, Pa., a corporation of Delaware
No Drawing. Filed Apr. 10, 1958, Ser. No. 727,557
14 Claims. (Cl. 260—2.1)

This invention relates to the production of foamed-plastic products having ion-exchange properties and an intercommunicating-cell structure. It is also concerned with methods of producing such products.

The primary object of the present invention is to provide novel and improved masses which are both permeable to liquids and gases and have ion-exchange properties. In accordance with one particular aspect of the invention, an important object is to dispose finely-divided synthetic ion-exchange resin materials in a porous mass formed of a coherent self-supporting polymeric mass permeated with intercommunicating cells which provide free passage for liquids and gases through the entire body of such masses. Another important object is to provide a solidified continuous form of ion-exchange material with a wide range of mechanical properties including flexibility adapting the material to dynamic ion-exchange applications, as well as the conventional static ion-exchange applications. The ability to flex the product repeatedly adds a new factor to favor the achievement of efficient ion-exchange. A subsidiary object is to provide a carrier for synthetic ion-exchange resins of finely-divided character adapted to support such ion-exchange resins in such a disposition as to provide a large surface area available for ion-exchange while avoiding the difficulties of compaction and interference with flow heretofore encountered when columns of ion-exchange granules of small size are employed. A more specific object, in a particular embodiment, is to provide a foamable polyurethane system having adequate chemical reactivity, foaming behavior, and practicable viscosity for use on conventional continuous-type polyurethane foam-producing machinery. Other objects and advantages of the invention will be apparent from the description thereof hereinafter.

In general, the products of the present invention comprise a matrix or mass of foam- or sponge-like character in which the cells are intercommunicating, and, of course, of macroscopic size. In other words, the matrix is of the open-cell type. In this matrix of a coherent self-supporting polymeric material, there are supported finely-divided particles of synthetic ion-exchange resins, having an ion-exchange capacity of at least about 3 milliequivalents per gram of resin, in the amount of at least about 20 parts by weight per 100 parts by weight of the material (other than the ion-exchange resin) forming the matrix. Preferably, the amount of ion-exchange resin is at least 30 parts by weight per 100 parts of the matrix material (excluding ion-exchange resin). The amount of ion-exchange resin may be as high as 150 parts per 100 parts by weight of the matrix but preferably it does not exceed about 70 parts per 100 parts of the matrix. The products have a low density up to but not exceeding about 20 pounds per cubic foot. They are characterized by good porosity and by high ion-exchange capacity when considered in terms of the amount of ion-exchange resin employed. One of the suprising and unexpected characteristics of the products of the present invention is the fact that the finely-divided ion-exchange resins continue to exert with relatively undiminished force their capacity for ion-exchange. Another surprising discovery is that the rate of ion-exchange obtainable from a given ion-exchange resin in predetermined quantity can be varied by properly selecting the material of the cellular matrix in which the resin is supported. Surprisingly, high rates can be obtained even from foamed products containing a relatively low proportion of ion-exchange resin. Presumably, this results from the attenuation of the matrix material into thin walls between cells so that the surface of the ion-exchange particles is generally not completely enveloped by the material of the matrix. In other words, most or all of the ion-exchange particles stud the surfaces of the walls of the cells. Thus, two desirable aims apparently work together in the products of the present invention, namely the production of low-density products as well as products having high ion-exchange capacity when considered in terms of the capacity of the ion-exchange resin incorporated therein. While both rigid and flexible (or resilient) types of cellular products are contemplated by the present invention, the resiliently flexible types are generally preferred because of the fact that they are capable of being manipulated in a manner such as to increase the rate of exchange tremendously. In using the rigid types, they are disposed in a body of the liquid from which ions are to be removed, which body may be stationary (in which event the ion-exchange article is desirably moved with respect to the body of liquid to provide the best contact between the ion-exchange resin and the ions in the liquid which contact would otherwise depend to a great extent on diffsion) but is preferably a moving stream passing continuously, and possibly repeatedly by recycling, through the article. These same ways of operation may be used with the flexible types of the ion-exchange products of the present invention. However, the flexible products which have rubber-like resiliency can be used in another manner which increases the rate of exchange and the efficiency. This manner of operating involves the alternate compressing and releasing of the compression of the product while it is disposed in a body of the liquid, which may be stationary or moving.

Any type of synthetic polymeric ion-exchange resin may be employed provided it has at least a capacity of 3 milliequivalents per gram. The use of resins having appreciably lower capacity is undesirable because of the higher viscosity of the foamable composition resulting from the necessity to use a large proportion of such resins in order to achieve a given capacity in the cellular products. The synthetic ion-exchange resins that are suitable include phenol-aldehyde condensation products into which amine, quaternary ammonium, or acid groups, such as carboxylic or sulfonic acid groups, are incorporated, and the cross-linked addition polymers which contain ion-exchange groups and are prepared by copolymerizing from about one-half mole percent up to 30 mole percent of a polyethylenically unsaturated monomer with a monoethylenically unsaturated monomer which either contains ion-exchange groups or contains groups which can be converted into ion-exchange groups by later reaction in any suitable manner.

Examples of monomers containing cation-exchaange groups include acrylic acid, methacrylic acid, itaconic acid, maleic acid, fumaric acid, carboxypentyl vinyl ether, sodium salt of ethylenesulfonic acid, esters of phosphonic acids, such as the methyl, ethyl, propyl, or butyl esters of vinylphosphonic acid, and the like as well as the alkali metal, ammonium or amine salts of such acids. Examples of monomers containing anion-exchange groups include aminoalkyl acrylates, methacrylates, or itaconates, e.g. β-aminoethyl acrylate, methacrylate, or itaconate di-ester, 5-aminopentyl methacrylate or itaconate di-ester, β-morpholinoethyl acrylate, methacrylate, or itaconate di-ester, 3-aminopropyl acrylate, methacrylate, or itaconate di-ester, 2-amino-2-methylpropyl acrylate, methacrylate or itaconate di-ester, β-N-methylaminoethyl acrylate, methacrylate or itaconate di-ester, β-N,N-dimethylaminoethyl acrylate, methacrylate or itaconate di-ester; N- aminoalkyl acrylamides, methacrylamides, or itaconamides, e.g. N-β-aminoethyl acrylamide or methacrylamide, N-5-aminopentyl acrylamide or methacrylamide, N,N-di-β-aminoethyl acrylamide or methacrylamide, N,N-di-β-methylaminoethyl acrylamide or methacrylamide, N,N-di-β-dimethylaminoethyl acrylamide or methacrylamide, N-β-dimethylaminoethyl acrylamide or methacrylamide, N-β-diethylaminoethyl acrylamide or methacrylamide, vinyloxyalkylamines, e.g. β-vinloxyethylamine, dimethyl - (β - vinyloxyethyl)amine, vinylthioalkylamines, such as dimethyl-(β-vinylthioethyl)amine; quaternary ammonium compounds obtained by the alkylation of any of the amines so far mentioned by such alkylating agents (which is herein intended to include aralkylating agents and substituted aralkylating agents), such as methyl chloride, ethyl chloride, benzyl chloride, allyl chloride, substituted allyl chloride, e.g., dodecylallyl chloride, dodecenyl chlorides, alkylbenzyl chlorides, e.g., octylbenzyl chlorides (from diisobutylene), any chloromethylated aromatic-like compounds, e.g. chlorobenzyl chloride, chloromethylated thiophene, chloromethylated furane, chloromethylated naphthalene, or corresponding bromides or iodides, e.g. phenoxyethyl bromide, methyl iodide; dimethyl sulfate, dimethyl sulfite, dimethyl phosphite, ethylene oxide, propylene oxide, styrene oxide, and butylene oxide. For example, a mixture of 17.9 grams (0.109 mole) of monomeric dimethylaminopropylacrylamide, 13.8 grams (0.109 mole) of benzyl chloride, 74 grams of absolute ethanol (30% solids) and di-β-naphthol were heated to reflux for two hours. The product was isolated by concentration in vacuo. Any of the quaternary ammonium monomeric compounds disclosed in applications Serial No. 441,643, filed July 6, 1954; Serial No. 461,285, filed October 8, 1954; Serial No. 495,784, filed March 21, 1955; Serial No. 495,785, filed March 21, 1955; and U.S. Patent 2,840,546, may be used herein and the disclosures in these applications of the quaternary ammonium monomers and their preparation are incorporated herein by reference. Examples of these quaternary compounds include (β-methacryloxyethyl)trimethylammonium hydroxide, chloride, methosulfate, bromide and so on, the dodecenyl chloride quaternary of 1-(β-dimethylaminoethyl)-3-vinyl-imidazolidinone-2 and the benzyl chloride quaternary of 1-(β-dioctadecylaminoethyl)-3-vinyl-imidazolidinone - 2 - (β-acryloxyethyl)trimethylammonium chloride, hydroxide, and so on, (β-methacrylamidoethyl)triethylammonium chloride, hydroxide, and so on, (β-vinyloxyethyl)trimethylammonium chloride, hydroxide, and so on.

Examples of cross-linking agents that may be used include any copolymerizable compound which contains two or more non-conjugated points of ethylenic unsaturation or two or more non-conjugated vinylidene groups of the structure, $CH_2=C=$, such as divinyltoluene, divinylbenzene, trivinylbenzene, divinylnapthalene, ethylene glycol diacrylate or dimethacrylate, 2-ethylhexane-1,3-dimethacrylate, divinylxylene, divinylethylbenzene, divinyl ether, divinyl sulfone, allyl ethers of polyhydric compounds such as of glycerol, pentaerythritol, sorbitol, sucrose, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyladipate, diallyl sebacate, diallyl tartrate, diallyl silicone, diallyl silicate, triallyl tricarballylate, triallyl aconitrate, triallyl citrate, triallyl phosphate, N,N'-methylenediacrylamide, N,N'-methylenedimethacrylamide, N,N'-ethylidenediacrylamide, 1,2-di(α-methylmethylenesulfonamido)-ethylene, and so on.

The ion-exchange resins, regardless of which type is employed, can be any of those known and commercially available. The preparation thereof is not an essential part of the present invention. They may be prepared in known ways in granular or bead form and be of more or less porous character. The size of the resin particles employed in the present invention may be anywhere from about 0.04 mm. to one mm. in diameter and preferred products are obtained from those having diameters or equivalent dimensions not in excess of 0.1 mm. In many commercial operations for producing particular ion-exchange resins a massive material is comminuted. It is one of the advantages of the present invention that it can satisfactoriiy employ such fines obtained from the comminuting operations as would be unusable in normal ion-exchange columns.

The material of the matrix may be formed of any coherent self-supporting polymeric substance which has film-forming character. Examples of such materials are the vinyl and acrylic resins, alkyd resins, polyurethanes, and modified alkyds which are coreacted with monoethylenically unsaturated monomers such as styrene or methyl methacrylate, or other acrylic esters. Among the vinyl and acrylic resins, it is intended to include the natural and synthetic rubbers. While the polymer of the matrix must be water-insoluble, it may be quite hydrophobic or it may be of hydrophilic character by virtue of polar groups therein, such as hydroxyl, carboxyl, amino, amido, ureido, or the like. Generally, the highly hydrophobic types of matrix material are more resistant to decomposition by hydrolysis, as in strongly acid or strongly basic media. However, wherever the hydrophilic types can be used, they have the advantage of a greater rate of exchange, apparently the result of more favorable contact of the ions in the aqueous medium with the ion-exchange resin particles within the product.

Any of the conventional ways of producing foamed products of open-cell structure from such matrix materials may be employed. For example, a mixture of the particulate ion-exchange resin and the matrix material, such as a vinyl or acrylic polymer with or without a plasticizer may be introduced into a chamber wherein it may be subjected to a gas under pressure and heated to fuse or coalesce the film-forming polymeric material. Upon sudden release of the gas and cooling, the mass sets into an open-cell sponge-like product. Alternatively, a mixture of the ion-exchange resin and a monomeric material adapted to form the matrix by polymerization may be introduced with a polymerizing agent and gas under pressure into a chamber wherein heating effects polymerization and fusion of the polymeric mass which upon release expands to an open-cell structure.

A procedure may be employed which involves the foaming of a material, which forms the matrix or is polymerized to form the matrix, by means of suitable wetting or foaming agents with agitation of such a foamed mass containing also the particulate ion-exchange resin and gelation or setting of the foamed mixture in foamed condition while exposed to the atmosphere. Suitable foaming agents include alkali metal dialkyl sulfo-succinates in which each alkyl group has between four and twenty-four carbon atoms. The dibutyl, dihexyl, and dioctyl sodium sulfosuccinates and octadecyl disodium sulfosuccinamate are suitable for use in producing low density foams. Another satisfactory group of foam-increasing agents are the alkali metal alkylaryl sulfates and sulfonates wherein there is present an alkyl group having from four to thirty carbon atoms. Examples of this group are dodecyl benzene sodium sulfonate, octyl naphthalene sodium sulfonate, dodecyl benzene ethanolamine sulfonate, monobutylphenyl-phenol sodium monosulfonate, monobutyl biphenyl sodium sulfonate, and the sodium salt of sulfated octoic acid ester of naphthol. Alkylaryl polyether alcohols and alkylaryl polyether sulfonates in which the alkyl group has from eight to twenty-four carbon atoms may be used. Examples of this group are the octadecyl phenol ethylene oxide condensation product and the polymer of such product, the sodium salt of dodecyl phenol ethylene oxide, and the sodium salt of decyl phenol ethylene oxide sulfate. The manufacture of members of this group of compounds is disclosed in detail in Patents 2,454,541, 2, 3, 4. The alkali metal or amine soaps of fatty acids having from twelve to twenty-four carbon atoms may be employed in preparing the composition. Examples of such soaps are sodium stearate, potassium stearate, triethanolamine palmitate, aminoethanolamine oleate, and ammonium laurate. The sorbitan esters of acids having from twelve to twenty-four carbon atoms are suitable surface-active agents. Examples thereof are sorbitan monolaurate and sorbitan trioleate. Another group of foam-increasing agents comprises the polyoxyalkylene sorbitan esters of acids containing from twelve to twenty-four carbon atoms. Examples of these compounds are polyoxyethylene sorbitan monolaurate, polyoxyethylene sorbitan tristearate, polyoxyethylene sorbitol monolaurate, and polyoxyethylene sorbitol pentaoleate. The alkyl and alkaryl quaternary ammonium halide compounds wherein at least one alkyl group of the former has from eight to twenty-four carbon atoms and at least one alkaryl group in the latter totals from eight to twenty-four carbon atoms are suitable for use in the composition. Examples of such quaternary ammonium compounds are cetyl dimethyl benzyl ammonium chloride, octadecyl dimethyl benzyl ammonium chloride, octadecanol-9-dimethyl ethyl ammonium bromide and diisobutylphenoxy-ethoxy ethyl dimethyl benzyl ammonium chloride. Another excellent group of foam-increasing agents comprises the alkyl sulfates and sulfonates wherein the alkyl groups have from eight to thirty carbon atoms. Examples thereof are lauryl sodium sulfate, sodium sulfated monoglyceride of oleic acid, octadecanol sodium sulfate, octyl alcohol potassium sulfate, lauryl methanol sulfonate, and sodium petroleum sulfonate. The sulfated and sulfonated alkyl amines and amides wherein there is at least one alkyl group having from eight to twenty-four carbon atoms have been employed with success. Examples of this group are triethanolamine oleate sulfate, butyl amine salt of dodecyl benzene sulfonic acid, and the sodium salt of the sulfonated reaction product of oleyl chloride and methyl taurine, having the formula

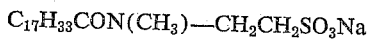

$$C_{17}H_{33}CON(CH_3)-CH_2CH_2SO_3Na$$

Another procedure involves the mixing of the ion-exchange resin particles with a gas-generating substance and the material which is to form the matrix as in the preceding case, and then subjecting the mixture which may also contain a plasticizer for the polymeric matrix-forming material, if desired, to conditions which liberate the gas such as heat, change of pH to either the acid or the alkaline side, and so forth. Examples of gas-generating substances include bicarbonates of sodium potassium, calcium, bismuth, and other metals, metallic oxalates and formates, such as calcium oxalate, manganese oxalate and sodium formate, and diazo compounds, such as amino-diazo-benzene. Other useful blowing agents are the ammonium compounds, such as ammonium carbonate, ammonium bicarbonate, ammonium benzoate, ammonium nitrate, and ammonium sulfite, the nitric and nitrous acid salts, such as calcium nitrate and barium nitrite, and various metallic carbamates. Others are diphenyl-4,4'-di(sulfonyl azide) and certain lower t-alkyl ammonium nitrites, such as t-butyl-, t-octyl-, t-amyl-, and t-nonyl-ammonium nitrite.

Another procedure is to mix the matrix-forming material with the ion-exchange resin particles, with or without a plasticizer for the matrix material, and a particulate or granular soluble solid which is soluble in a solvent which does not attack the matrix-forming material or the ion-exchange resin. Most advantageously water-soluble solids are used such as common salt, sugar, or sodium sulfate, which are readily soluble in water. The mixture contains a sufficiently large proportion of the soluble solid to provide intercommunicating cells upon dissolution of the solid after coalescence or gelatin of the matrix material such as by heat.

All of these procedures may be employed with numerous vinyl or acrylic polymers, solutions thereof, or plastisols formed with plasticizers for the particular matrix material. Examples of the polymeric materials include homopolymers and copolymers of vinyl chloride, vinyl acetate, acrylonitrile, methacrylonitrile, ethylene, isobutylene, vinylidene chloride, styrene, esters of acrylic acid, methacrylic acid, or other acids such as maleic acid, fumaric acid, and itaconic acid, with alcohols having from 1 to 18 carbon atoms. Preferably, the esters of these acids with lower alcohols having from 1 to 4 carbon atoms are employed such as methyl acrylate or methacrylate, ethyl acrylate or methacrylate, and butyl acrylate or methacrylate. Polyvinyl acetals are also adapted to be employed in any of these manners and particularly polyvinyl formal.

The processes may also be employed to form intercommunicating cell masses from a polyol or polyhydroxy compound, including simple or complex alkyds. Examples of the polyhydroxy compounds include castor oil, simple glycols having 2 to 10 carbon atoms, hydroxyl-terminated polyethers including polymers of ethylene oxide, propylene oxide, trimethylene oxide, and mixtures thereof, condensation products of one or more of these oxides with a polyol, such as a glycol having 4 to 10 carbon atoms, glycerol, trimethylolethane, trimethylolpropane, pentaerythritol, hexitols including sorbitol and mannitol, hexitans including sorbitan and mannitan, and hexides including sorbide and mannide. Besides castor oil, other hydroxyl-terminated polyesters may be used including the condensation products of one of the oxides mentioned above, such as ethylene oxide, or a mixture thereof, with an ester of a polyol which ester still contains at least two hydroxyl groups, such as the monoesters of glycerol with a fatty acid having 8 to 18 carbon atoms of which glyceryl monostearate, monopalmitate, and monoleate are representative, the mono- or di-esters of hexitans, such as sorbitan monopalmitate or dipalmitate, the mono-, di-, tri-, or tetra-esters of a hexitol such as sorbitol tetra-oleate. The alkyds that may be employed may be derived from the condensation of a polycarboxylic acid with a polyhydroxy alcohol. In general any of the polycarboxylic, and preferably dicarboxylic, organic acids such as adipic, phthalic, maleic, sebacic, methylenedisalicylic, tetrachlorophthalic, itaconic, oxalic, diglycolic, acids are suitable and may be used to react with the polyhydroxy alcohol to form the polyester resin. If convenient, these acids may be used in the form of the anhydride such as phthalic anhydride. It is permissible to use a mixture of two such acids, such as a mixture of an aromatic dicarboxylic acid and an aliphatic dicarboxylic acid.

Polyhydric alcohols which are useful for making the polyester or alkyd include the alkyl polyhydroxy alcohols such as glycol, polyglycol, poly(ethylene glycol), and any of the hydroxy-terminated polyethers or polyesters mentioned above, as well as those alcohols containing at least three or more hydroxy groups such as glycerol, sorbitol, mannitol, pentaerythritol, trimethylolpropane, and trimethylolethane.

In some instances, less preferably tribasic acids may be reacted with diols to produce the polyester resin, and for this purpose tricarballylic, citric, camphoronic, aconitic or trimesic acids may be reacted with a diol such as ethylene glycol, diethylene glycol, and propylene glycol.

Where a diol is reacted with a tricarboxylic acid about 2 to about 4 mols of diol are reacted with about 1 mole of tricarboxylic acid, while if a triol is reacted with a dicarboxylic acid, about 2 mols of triol are reacted with about 1 to 3 mols of dicarboxylic acid. If desired, the dicarboxylic or tricarboxylic acid portion, may be and preferably is formed of two or more such acids, while the diol, triol or other polyhydric alcohol is usually, although not necessarily a single alcohol. Thus, in general, the acid-alcohol ratio should always be adjusted so that the polyester may be cooked to an acid number of from 10 to 75 and preferably from 20 to 60, with about 40 or 45 being an optimum, when producing a reinforced foam having a density of about 15 lbs. per cubic foot.

The dicarboxylic acid and the polyhydric alcohol are reacted by heating and the reaction is carried on until the acid number is 75 or less. The water formed during the reaction is removed in the manner usual in the making of alkyd resins. If desired, and it is often preferable, the reacting mixture may include modifiers to limit and control the length of the molecular chain of the polyester or alkyd resin, and for this purpose various monobasic acids are suitable additions to the reaction mixture. Among the monobasic acids which are preferred when high resistance to heat distortion is desired are formic, acetic, propionic, butyric, valeric, caproic, enanthic, caprylic, pelargonic, capric, lauric, benzoic, lactic, sorbic and their unsaturated analogues.

When unsaturated acids are employed for making the modified alkyd types in which the alkyd is coreacted by addition copolymerization with unsaturated monomers such as styrene, methyl methacrylate, or any of the monomers mentioned hereinabove (for making the vinyl or acrylic polymeric matrix material), the procedure and materials disclosed in U.S. Patent 2,505,353 may be employed, merely being modified by the addition of the ion-exchange particles to the masses therein used as the starting materials for producing the micro-porous resins.

A preferred system for producing the products of the present invention is to incorporate the ion-exchange resin particles in a mixture of a polyether or polyester and a polyisocyanate and subject the mixture to the usual conditions for producing foams of polyurethane type. The polyester employed in such process may be an alkyd or modified alkyd having molecular weights from 300 to 8000 obtained from any of the polycarboxylic acids and polyhydric alcohols mentioned above. Instead of the polyesters, there may be used polyethers formed from glycols having from 2 to 10 carbon atoms and molecular weights in the range of 300 to 8000. Examples of the glycols include ethylene glycol, propylene glycol, trimethylene glycol, hexamethylene glycol, octamethylene glycol, and so on. There may also be used block copolymers of ethylene oxide and propylene oxide of the formulas

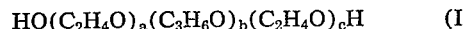

$$HO(C_2H_4O)_a(C_3H_6O)_b(C_2H_4O)_cH \qquad (I)$$

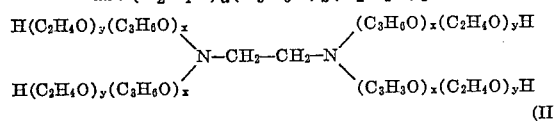

where the average values of the subscripts may be as follows:

$a=1$ to 6,
$b=12$ to 40,
$c=1$ to 6,
$x=7$ to 19, and
$y=1$ to 3.

The alkyds may also be modified with fatty acids or esters such as castor oil and in place of the dicarboxylic acids mentioned above, the so-called dimers of linolenic or linoleic acid may be used. The alkyd may be formed in the usual manner by reacting a mixture of the polyhydric alcohol, the polycarboxylic acid, and any modifying fatty acid or oil in a common reaction vessel at a temperature of 50° to 150° C. or higher.

The diisocyanate used may be one or more of the following: ethylene diisocyanate, trimethylene diisocyanate, tetramethylene diisocyanate, pentamethylene, diisocyanate, propylene-1,2-diisocyanate, butylene-1,2-diisocyanate, butylene-1,3-diisocyanate, butylene-2,3-diisocyanate, and butylene-1,3-diisothiocyanate; alkylidine diisocyanates such as ethylidene diisocyanate $$(CH_3CH(NCO)_2)$$

butylidene diisocyanate $CH_3CH_2CH_2CH(NCO)_2$, cyclo- alkylene diisocyanates such as cyclopentylene-1,3-diisocyanate, cyclohexylene-1,2-diisocyanate, cyclohexylene-1,4-diisocyanate; aromatic diisocyanates such as m-phenylene diiisocyanate, p-phenylene diisocyanate, 1-methylphenylene-2,4-diisocyanate, naphthylene - 1,4 - diisocyanates, o,o'-toluene diisocyanate; aliphatic-aromatic diisocyanates, such as xylylene-1,4-diisocyanate, xylylene-1,3-diisocyanate, 4,4'-diphenylenemethane diisocyanate, and 4,4'-diphenylenepropane diisocyanate. Toluene diisocyanates of the 2,4 and 2,6 isomeric forms are preferably employed to obtain fast reaction, but such isocyanates as diphenyl methane-4,4'-diisocyanate and p-menthane-diisocyanate may be used for a slower reaction or a more vigorous catalyst is employed. The proportion of diisocyanate may be from 6 to 85% by weight based on the weight of the alkyd. Within this broad range, it is preferred to employ from 25 to 55% of the diisocyanate on the weight of the alkyd.

While it is not essential that a catalyst be present, a tertiary amine may be employed to advantage where it is desired to shorten the time of reaction. As much as 2 to 10% of such a tertiary amine may be employed based on the weight of the diisocyanate. Examples of the tertiary amines that are thus useful include the N-alkyl morpholines in which the alkyl substituent has from 1 to 18 carbon atoms of which N-methyl morpholine is typical, triethylamine, triethanolamine, dimethylethanolamine, N,N-diethylcyclohexylamine, and 1,4-diazabicyclo[2.2.2]octane.

The polyurethanes may be obtained merely by mixing the alkyd with the diisocyanate and water with or without the catalyst at normal room temperature up to 60° C. The time required to effect the reaction and complete it may vary from 15 seconds to several hours depending upon whether a catalyst is employed, the activity of the diisocyanate, and the temperature. The mixture of the several reactants with or without a catalyst may be placed in a mold in which it is formed into the desired shape during the completion of the reaction. Likewise, a mixture of the reactants may be extruded continuously and, for this purpose, the several ingredients and the temperature may be controlled so as to allow adequate time for the passage of the mixture from the point of mixing into the extrusion channel before setting occurs.

In order to stabilize the foam, an emulsifier may be employed. The amount of emulsifier may be from 0.5 to 5% on the weight of alkyd and any of the usual emulsifiers may be employed. Non-ionic emulsifiers are preferred, such as the ethylene oxide condensates derived from vegetable oils, such as castor oils, from alcohols, organic acids, phenols, and hydroxy esters.' More specifically, such emulsifiers include castor oil condensed with 6 to 60% or more oxyethylene units, alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonoylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide, with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule, analogous ethylene oxide condensates of long-chained alcohols, such as octyl, decyl, lauryl, or cetyl alcohols, ethylene oxide derivatives of etherfied or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

In addition to the emulsifier, there is incorporated from 1 to 5% of water based on the weight of polyester in order to develop the necessary gas for formation of the cellular mass. In making the cellular products, the various ingredients may be mixed in different ways, depending on the resin/polyisocyanate system involved. When it is desirable to manufacture the cellular ion-exchange products of the present invention from polyesters on conventional continuous production from machines, the ion-exchange resin is first mixed into the polyester. If the mix exhibits too high a viscosity for pumping on such machines (e.g., if viscosity is appreciably above 25,000 centipoises when measured on a Brookfield Viscometer), a viscosity-reducing aid may be added in the form of a plasticizer or other viscosity reducing liquids compatible with the foam system. The polyester/ion-exchange resin mixture (with any necessary plasticizer such as tris($\beta$-chloroethyl)phosphate or tricresyl phosphate) is in turn mixed with the diisocyanate and an activator mixture consisting of water and catalyst, and where necessary, an emulsifier. In order to produce the desired ion-exchange products by simultaneous mixing, the polyester/ion-exchange resin mixture is supplied to the mixing head from one line in the machine, the diisocyanate from another, and the activator from still another separate line.

When it is desired to make the cellular ion-exchange products of the invention from what are commonly referred to in the art as "prepolymers," the polyol-containing material is first reacted with the diisocyanate, in an amount sufficient to react with the hydroxyl groups of the polyol plus an additional amount for subsequent reaction with water to liberate the necessary gas for the final foam. The ion-exchange resin is added to the "prepolymer" and followed by the catalyst-water (and emulsifier, if necessary) mixture. Finally, the mixture is introduced into a mold or fed continuously to a container on a moving conveyor, and the foam allowed to rise and set at room temperature or with the application of heat, dependent on the curing requirements for the polyurethane system employed.

Dyes, pigments, inert filler materials, perfumes, cosmetics, drugs, antiseptics, bactericides, detergents, and other materials may be included within the matrix-forming polymeric material prior to the foaming operation. Alternatively, such materials may be incorporated into the cellular mass during or after the foaming operation. Such adjuvants or additives may be introduced for various purposes such as to incorporate an additional functional agent within the body of the cellular mass or to modify the absorptive properties thereof. For example, such hydrophilic materials as fibers or filaments of cotton, $\alpha$-cellulose derived from wood pulp, and rayon either of viscose or cuprammonium cellulose derivation may be introduced to increase the softness and absorptive capacity or to increase the tensile strength of the matrix.

The products can be formed directly in the form ultimately desired; alternatively, they may be formed in larger masses and then cut to the desired size and shape. The formation may be effected in stationary molds or continuously such as by extrusion to form rods, tubes, or slabs. They may be cast upon various substrates to form laminar products or coated products. In any case, they are of low density, high porosity, and exhibit high ion-exchange capacity when considered in terms of the amount of ion-exchange resin incorporated.

As pointed out hereinabove, the products of the present invention provide ion-exchange materials in an improved system. By supporting ion-exchange particles or beads in the wall surfaces, reduction in the rate of exchange that occurs with loose bead resins because of packing during use in a column is avoided. By varying the proportions between ion-exchange resin and matrix-forming polymeric material and by properly selecting the particular resin and polymeric material used in any combination, a wide range of ion-exchange capacities and rates are obtainable. The products of the present invention are thus quite versatile in nature. When hydrophilic matrix-forming polymeric material is used, the rate of ion-exchange is frequently substantially higher than that obtainable with the corresponding ion-exchange resin in loose bead form. Likewise, the rate of ion-exchange can be increased even more by the expedient of alternate compression and release of the resilient ion-exchange products of the present invention.

The cellular ion-exchange products are useful in any situation where ion-exchange resins find utility. They are capable of regeneration in customary fashion after their capacity has been exhausted so they are useful in systems wherein they must be repeatedly used and regenerated. On the other hand, they may also be employed as expendable or disposable articles wherein they are discarded after serving one use. The cellular products of the present invention are useful as surgical dressings, sanitary napkins, tampons, and catamenial pads. They also serve as deodorant pads, dress shields, and the like. For all of these uses which may be broadly termed sanitary uses, they may be initially formed in the proper shape or they may be cut to shape from a larger mass thereof. In such cases which involve absorbency, it is generally preferable to have the matrix formed of a hydrophilic material. The use of cellulose fiber fillers is also advisable to increase softness and absorbency. The product may be employed as a filler in a surgical dressing, catamenial pad, or the like, in which it may be disposed within a sheath of gauze or other protective material. The cellular products of the present invention may be formed into thin sheets may may be fashioned into suitable form to serve as the lining in clothing, particularly for the purpose of protection of the body of the wearer against exposure to toxic gases or vapors which may be present in the air in emergency situations such as may at times occur in chemical factories, fires, or chemical warfare. The cellular materials are also useful as filters not only for liquids but for gasses, and they may be shaped into any suitable form or size for use therein particularly for scavenging acidic or basic gasses. Cleaning sponges formed of the cellular products of the present invention are quite generally applicable and have particular value in the cleaning-up of spillages of acidic or basic character and also of radio-active types. The cellular products of the present invention are also useful as linings for caps or lids of containers in which various chemical substances are stored. In such situations, they serve to absorb volatile acidic or basic constituents from the atmosphere within the container above the contents and thereby extend the shelf-life thereof. Bathing sponges formed of the cellular articles of the present invention, which may or may not contain a soap or other detergent, are particularly useful in hard water areas and serve to soften the water brought into contact with the body of the person by the sponge. After use, the sponge can then be reconditioned for the next bath by repeatedly squeezing in a sodium chloride solution.

In the following examples which are illustrative of the present invention, parts and percentages are by weight unless otherwise specifically noted.

*Example 1*

A cation-exchange foam was prepared by first thoroughly mixing 45 parts of toluene diisocyanate (80% 2,4-isomer, 20% 2,6-isomer) with 100 parts of a polyester (derived from 293 parts of adipic acid, 212 parts diethylene glycol, and 32 parts of 1,1,1 - trimethylolethane, and having a molecular weight of approximately 1,700). To this mixture was added 100 parts of a finely-divided (100–200 mesh Tyler Standard Screen) nuclear sulfonic acid ion-exchange resin (sulfonated styrene/8.5% divinylbenzene copolymer—United States Patent 2,366,007) in the sodium salt form and mixing was effected until homogeneous. Then 2.24 parts of emulsifier (sulfonated vegetable oil, e.g., cottonseed oil) 3.6 parts of water, and 1.90 parts of N-methyl morpholine were added in that order with thorough mixing after each addition. Finally, the mix was poured into an open mold and allowed to foam to full height which required about 2 minutes. After 30 minutes, the ion-exchange foam was stripped from the mold and cured overnight at 70° C. The product had a capacity of 5760 milliequivalents per cubic foot and a density of 7.2 pounds per cubic foot. A sample of this foamed product was flexed several times in 1 N-sulfuric acid to convert the resin to acid form and then washed with pure water several times. On flexing (repeated compression and relaxation) in dilute aqueous caustic soda solution, the foam brought about complete neutralization of the solution in a short time.

*Example 2*

A weakly acid cation-exchange foam was prepared in the following manner. To 100 parts of a polyester (described in Example 1) were added 28.5 parts of toluene diisocyanate (80% 2,4-isomer, 20% 2,6-isomer) with thorough mixing. To this mixture were added 50 parts of finely-divided (100–200 mesh) carboxylic ion-exchange resin (methacrylic acid/5% divinylbenzene copolymer—United States Patent 2,340,111) and mixing was effected until homogeneous. Then 1.12 parts of the sulfonated vegetable oil emulsifier of Example 1, 1.80 parts of water, and 1.80 parts of N-methyl morpholine were added in that order with thorough mixing after each addition. Finally, the mix was poured into an open mold and allowed to foam to full height. The foam had a density of 10 pounds per cubic foot and a capacity of 12,700 milliequivalents per cubic foot.

This foamed resin was converted to the sodium salt form by alternate compression and decompression in a 4% sodium hydroxide solution in water for about 15 minutes. Then it was converted, by similar flexing in a 20% calcium chloride solution in water, to the calcium salt form. This product was rinsed with water and while still wet was placed at rest in a 0.1 N aqueous silver nitrate solution wherein it was converted to the silver salt form, equilibrium being reached in approximately 1 hour. A corresponding amount of the calcium salt form of the 100 to 200 mesh beads of the same ion-exchange resin as that used in making the cellluar product was placed in a 0.1 N aqueous silver nitrate solution. It was found that the loose resin beads required about 15 hours to reach equilibrium.

*Example 3*

An anion-exchange foam was prepared by first thoroughly mixing 39 parts of toluene diisocyanate (65% 2,4-isomer, 35% 2,6-isomer) with 100 parts of a polyester (derived from 100 parts of the polycarboxylic acid residue (of the vacuum distillation of acidified by-product acids obtained in the manufacture of sebacic acid) described in United States Patent 2,267,269, 14.2 parts 1,1,1-trimethylol ethane and 4.4 parts diethylene glycol, and having a molecular weight of approximately 1500). To this mixture was added 100 parts of a finely-divided (100–200 mesh) weak base ion-exchange resin (obtained by the condensation of a bisphenolmethane, formaldehyde, and diethylenetriamine in accordance with United States Patent 2,356,151) and mixed until homogeneous. Then a solution of 0.70 part of triethylene diamine (which is more accurately called 1,4-diazabicyclo[2.2.2] octane) in 2.66 parts of water was added and mixed in thoroughly. The mixture was poured into an open mold and allowed to foam undisturbed to full height. The product was flexible and quite soft. It had a capacity of 14,600 milliequivalents per cubic foot at a density of 7.5 pounds per cubic foot.

*Example 4*

An anion-exchange foam was prepared by first thoroughly mixing 100 parts of a plasticizer [tri-(β-chloroethyl) phosphate] with 100 parts of the polyester used in Examples 1 and 2. Then 100 parts of finely-divided (100–200 mesh) strong base ion-exchange resin (chloromethylated and trimethylamine-quaternized styrene/5% divinylbenzene copolymer—United States Patent 2,591,573) were added and blended in thoroughly. Then 2.24 parts of the sulfonated vegetable oil emulsifier of Example 1, 3.60 parts of water, and 2.0 parts of N-methyl morpholine were added with thorough mixing after each addition. Finally, 45 parts of toluene diisocyanate (80% 2,4-isomer, 20% 2,6-isomer) were added and mixed in for 30 to 45 seconds, the mixture poured into an open mold, and allowed to foam undisturbed to full height. The resulting ion-exchange foam had a capacity of 3350 milliequivalents per cubic foot and a density of 11 pounds per cubic foot.

*Example 5*

A cation-exchange foam was prepared by first thoroughly mixing 30 parts of tri(β-chloroethyl) phosphate with 100 parts of the polyester used in Example 3 followed by the addition of 50 parts of a finely-divided (100–200 mesh) weak acid ion-exchange resin (5% divinylbenzene/methacrylic acid copolymer) and mixing continued until homogeneous. Then a solution of 0.70 part of triethylene diamine (i.e., 1,4-diazabicyclo[2.2.2] octane) in 2.66 parts of water was added and mixed in thoroughly. Finally, 39 parts of toluene diisocyanate (80/20 isomer ratio) were added and well mixed in and the mixture poured into an open mold and allowed to foam undisturbed to full height. The product was flexible and soft. The ion-exchange foam had a density of 4.5 pounds per cubic foot and had a capacity of 4720 milliequivalents per cubic foot.

*Example 6*

To 100 parts of a polypropylene glycol prepolymer (prepared by heating at 100° C. and stirring for 2 hours a mixture of 100 parts polypropylene glycol M.W. 2,000 and 35 parts of toluene diisocyanate—80/20 isomer mixture) were added 67 parts of the same finely-divided (100–200 mesh) weak base anion-exchange resin as was used in Example 3 with thorough mixing. Then a mixture of 2.4 parts water, 1.0 part N-methyl morpholine, 1.0 part triethyl amine, and 0.6 part of a dimethylpolysiloxane silicone oil (DC–200—50 centistokes) were added and mixed in until foaming began. The foaming mix was poured into an open mold and allowed to foam undisturbed to full height. The product had a density of 7.5 pounds per cubic foot and a capacity of 13,650 milliequivalents per cubic foot.

*Example 7*

To 100 parts of a castor oil-toluene diisocyanate prepolymer (obtained by co-reacting at 100° C. for one hour a mixture of castor oil and the (80:20 isomer weight ratio) toluene diisocyanate in a 100:70 weight ratio) were added 25 parts of the same finely-divided anion-exchange resin as that used in Example 3 with thorough mixing to insure uniformity. Then a mixture of 1.2 parts of N-methyl morpholine, 1.2 parts triethylamine (see Example 3), 2.6 parts of water, and 2.0 parts of the sulfonated vegetable oil emulsifier of Example 1 was added and mixing continued until foaming commenced. The foaming mix was poured into an open mold and allowed to foam, undisturbed, to full height.

The product was semi-rigid and had a density of 3 pounds per cubic foot. The capacity of the ion-exchange foam was 2720 milliequivalents per cubic foot.

*Example 8*

A polyester was prepared by reacting 293 parts of adipic acid with 948 parts of polyethylene glycol (M.W. 400) and 32 parts of 1,1,1-trimethylol ethane at 240° C. The polyester prepolymer was made by prereacting 100 parts of the polyester with 43 parts of toluene diisocyanate (80/20 isomer mixture) at 100° C. for two hours. To 100 parts of the resulting hydrophilic prepolymer were added 67 parts of the same finely-divided (100–200 mesh) ion-exchange resin as that used in Example 4. The mixture was stirred until homogeneous, then 1.04 parts of the sulfonated vegetable oil emulsifier of Example 1, 2.08 parts of water, and 1.6 parts of N-methyl morpholine were added in that order with thorough mixing after each addition. The foaming mix was poured into a mold and allowed to foam to full height. The foam had an ion-exchange capacity of 4600 milliequivalents per cubic foot and a density of 11 pounds per cubic foot. This product has a definitely hydrophilic matrix which markedly favors the rate of exchange.

*Example 9*

An anion-exchange foam was prepared by thoroughly blending 20 parts of the same finely-divided (100–200 mesh) weak base ion-exchange resin as that used in Example 3 into 100 parts of a dimer acid polyester (derived from 845 parts of polymerized fatty acids (dimeric polymers of unsaturated fatty acids such as dimerized linoleic or linolenic acids prepared as described in column 3, lines 19 to 36 of United States Patent 2,634,244), 190 parts of diethylene glycol, and 17 parts 1,1,1-trimethylol ethane). To the homogeneous mixture were added 39 parts of toluene diisocyanate (80/20 isomer mixture), 2.66 parts of water, and 0.70 part of triethylene diamine (1,4-diazabicyclo[2.2.2]octane) with thorough mixing after each addition. The mix was then poured into an open mold and allowed to foam, undisturbed, to full height. The product had a density of 2.5 pounds per cubic foot and a capacity of 1420 milliequivalents per cubic foot.

*Example 10*

A cation-exchange foam was prepared by first thoroughly blending 100 parts of tri-($\beta$-chloroethyl) phosphate with 100 parts of the polyester described in Example 9. To this was added 100 parts of finely-divided (100–200 mesh) carboxylic acid ion-exchange resin (5% divinylbenzene/methacrylic acid copolymer of Example 2) and mixed until homogeneous. Then 39 parts of toluene diisocyanate, 2.66 parts of water, and 0.70 part of triethylene diamine (see Example 3) were added in that order with thorough mixing after each addition. The foaming mix was poured into a mold and allowed to foam to full height. The ion-exchange foam had a density of 9 pounds per cubic foot and a capacity of 12,200 milliequivalents per cubic foot.

*Example 11*

In 160 parts of hot water were dissolved 10 parts of high molecular weight grade polyvinyl alcohol and 10 parts medium molecular weight grade polyvinyl alcohol. To the solution, after cooling to 25° C., were added 50 parts of the same finely-divided sulfonic acid ion-exchange resin as that used in Example 1 (except that it was in acid form) and this was mixed in thoroughly. Then 3.0 parts of a non-ionic surface-active agent (t-octylphenol ethylene oxide adduct containing 7 to 12 moles of ethylene oxide per mole of t-octylphenol) were added and the mixture beaten at high speed on a rotary-type mixer until the maximum amount of stiff froth had developed (about 3 minutes). Finally, 30 parts of 37% aqueous formaldehyde were added and mixing at high speed continued for 2 minutes. The resulting froth was then transferred to a rectangular shaped porcelain tray and allowed to stand at room temperature for 18 hours. At the end of this time the ion-exchange foam was removed from the mold and washed in running water for three to five minutes. This gave a foam, comprising the ion-exchange resin in a cellular polyvinyl formal matrix of the type disclosed in United States Patent 2,609,347, that was extremely soft and pliable when wet, but quite rigid when completely dry.

*Example 12*

A solution of 3 parts of a surface-active agent (t-octylphenol ethylene oxide (7 to 12 mole) adduct) in 100 parts of water was beaten at moderate speed on a rotary mixer until a loose froth had developed (1 to 2 minutes). To this froth was added an intimate mixture of 150 parts of a dry powdered urea-formaldehyde precondensate containing about 4% of diammonium phosphate and 100 parts of the same finely-divided (100–200 mesh) ion-exchange resin as that used in Example 4. The frothy mixture was beaten at high speed on the rotary mixer for an additional 2 minutes and then poured into waxed paper molds and allowed to stand at room temperature for 24 hours. Then the foams were placed in an oven at 90° C. for 5 hours to complete the cure; the resultant product was quite rigid but not friable.

*Example 13*

To 50 parts of a plasticizer (epoxidized soybean oil) were added 10 parts of N,N'-dimethyl-N,N'-dinitrosoterephthalamide as a blowing agent and the mixture was stirred with great shear until homogeneous. This mixture together with an additional 50 parts of the same plasticizer were added to 100 parts of dispersion grade polyvinyl chloride resin and the mixture was stirred in until homogeneous. To this were added 40 parts of the finely-divided ion-exchange resin of Example 4 which was mixed in thoroughly. The mixture was then transferred to a shallow metal mold and placed in an oven at 90° to 95° C. for 15 minutes when the mass had expanded to full volume. Then the foam was placed in an oven at 160° to 165° C. for 30 minutes to bring about fusion. The resultant product was soft and flexible; it had a density of 7.5 lbs./ft.$^3$.

*Example 14*

A cation-exchange foam was prepared by first mixing a large batch of product at a ratio of one part of the polyester in Example 1 with one part of tris-chloroethyl phosphate. To this mixture was added 100 parts of the ion-exchange resin mentioned in Example 1 at a ratio of one part of ion-exchange resin to 2 parts of the aforementioned mix. The product was then put into a conventional continuous foam-producing machine and blended with toluene diisocyanate, water, N-methyl morpholine and emulsifier (a sulphonated vegetable oil) by metering to provide ratios of 15 parts of toluene diisocyanate, 1.2 parts of water, 0.7 part of N-methyl morpholine, and 0.7 part of emulsifier per 100 parts of the polyester/ion exchange resin/plasticizer mixture. The toluene diisocyanate was supplied to the mixing chamber by a line separate from that used for the resin mixture, and the water, morpholine, and emulsifier supplied as a single mixture from a third line. The final mix prepared in the mixing chamber was ejected continuously into a large container on a moving conveyor. The foam-ejection rate and conveyor movement were regulated to allow a 15-minute elapsed time between ejection of the mix and removal of the foam at the end of the conveyor. The foam was then cut into ten-foot lengths of thickness ranging from 1/16" to 1/4", for subsequent conversion to the active acid form as outlined in Example 1.

It is to be understood that changes and variations may

We claim:
1. An article of manufacture comprising a coherent, self-supporting foamed intercommunicating-cell type mass of water-insoluble polymeric material in which the cells are of macroscopic size, the polymeric material being selected from the group consisting of addition polymers of a polymerizable monoethylenically unsaturated compound, alkyd resins, and polyurethanes, the mass containing particulate ion-exchange resin distributed in the walls between such cells, the ion-exchange resin being a cross-link synthetic resin selected from the group consisting of organic condensation and addition polymers containing ion-exchange groups, the amount of such ion-exchange resin being from 20 to 150 parts by weight per 100 parts by weight of the first-mentioned polymeric material, said article having a density of not over 20 pounds per cubic foot and being permeable to both gases and liquids, whereby the ion-exchange resin is readily available to liquids introduced into the mass.

2. An article of manufacture comprising a coherent, self-supporting foamed intercommunicating-cell type mass of water-insoluble polymeric material in which the cells are of macroscopic size containing particulate ion-exchange resin distributed in the walls between such cells, the ion-exchange resin being a cross-linked synthetic resin selected from the group consisting of organic condensation and addition polymers containing ion-exchange groups, the amount of such ion-exchange resin being from 20 to 150 parts by weight per 100 parts by weight of the first mentioned polymeric material, said article being flexible, resilient, and having a density of not over 20 pounds per cubic foot and being permeable to both gases and liquids, whereby the ion-exchange resin is readily available to liquids introduced into the mass.

3. An article of manufacture comprising a coherent, self-supporting foamed intercommunicating-cell type mass of water-insoluble polymeric material in which the cells are of macroscopic size, the polymeric material being selected from the group consisting of addition polymers of a polymerizable monoethylenically unsaturated compound, alkyd resins, and polyurethanes, the mass containing particulate ion-exchange resin distributed in the walls between such cells, the ion-exchange resin being a cross-linked synthetic resin selected from the group consisting of organic condensation and addition polymers containing ion-exchange groups, the amount of such ion-exchange resin being from 20 to 150 parts by weight per 100 parts by weight of the first-mentioned polymeric material, said article being rigid and having a density of not over 20 pounds per cubic foot and being permeable to both gases and liquids, whereby the ion-exchange resin is readily available to liquids introduced into the mass.

4. An article of manufacture comprising a coherent, self-supporting foamed intercommunicating-cell type mass of water-insoluble polymeric material in which the cells are of macroscopic size and extend through thin attenuated walls of the polymeric material, the polymeric material being selected from the group consisting of addition polymers of a polymerizable monoethylenically unsaturated compound, alkyd resins, and polyurethanes, the mass containing particulate ion-exchange resin studded on the surfaces of the aforesaid walls, the ion-exchange resin being a cross-linked synthetic resin selected from the group consisting of organic condensation and addition polymers containing ion-exchange groups, the amount of such ion-exchange resin being from 20 to 150 parts by weight per 100 parts by weight of the first-mentioned polymeric material, said article having a density of not over 20 pounds per cubic foot and being permeable to both gases and liquids, whereby the ion-exchange resin is readily available to liquids introduced into the mass.

5. An article of manufacture comprising a coherent, self-supporting, foamed, intercommunicating-cell type mass of hydrophilic water-insoluble polymeric material in which the cells are of macroscopic size and extend through the attenuated walls of the polymeric material, the polymeric material being selected from the group consisting of addition polymers of a polymerizable monoethylenically unsaturated compound, alkyd resins, and polyurethanes, the mass containing particulate ion-exchange resin studded on the surfaces of the aforesaid walls, the ion-exchange resin being a cross-linked synthetic resin selected from the group consisting of organic condensation and addition polymers containing ion-exchange groups, the amount of such ion-exchange resin being from 20 to 150 parts by weight per 100 parts by weight of the first-mentioned polymeric material, said article having a density of not over 20 pounds per cubic foot and being permeable to both gases and liquids, whereby the ion-exchange resin is readily available to liquids introduced into the mass.

6. An article of manufacture comprising a coherent, self-supporting, foamed, intercommunicating-cell type mass of hydrophilic water-insoluble polymeric material in which the cells are of macroscopic size and extend through thin attenuated walls of the polymeric material, the mass containing particulate ion-exchange resin studded on the surfaces of the aforesaid walls, the ion-exchange resin being a cross-linked synthetic resin selected from the group consisting of organic condensation and addition polymers containing ion-exchage groups, the amount of such ion-exchange resin being from 20 to 150 parts by weight per 100 parts by weight of the first-mentioned polymeric material, said article being flexible, resilient, and having a density of not over 20 pounds per cubic foot and being permeable to both gases and liquids, whereby the ion-exchange resin is readily available to liquids introduced into the mass.

7. An article of manufacture comprising a coherent, self-supporting, foamed, intercommunicating-cell type mass of water-insoluble polymeric material in which the cells are of macroscopic size and extend through thin attenuated walls of the polymeric material, the polymeric material being selected from the group consisting of addition polymers of a polymerizable monoethylenically unsaturated compound, alkyd resins, and polyurethanes, the mass containing particulate ion-exchange resin studded on the surfaces of the aforesaid walls, the ion-exchange resin being a cross-linked synthetic resin selected from the group consisting of organic condensation and addition polymers containing ion-exchange groups, the amount of such ion-exchange resin being from 20 to 150 parts by weight per 100 parts by weight of the first-mentioned polymeric material, said article being rigid, and having a density of not over 20 pounds per cubic foot and being permeable to both gases and liquids, whereby the ion-exchange resin is readily available to liquids introduced into the mass.

8. An article as defined in claim 1 in which the polymeric material is a polyurethane.

9. An article as defined in claim 1 in which the polymeric material is an addition polymer of a polymerizable monoethylenically unsaturated compound.

10. An article as defined in claim 1 in which the polymeric material is a polyvinyl chloride.

11. An article as defined in claim 1 in which the polymerica material is a polyvinyl formal.

12. A method of producing a cellular article having ion-exchange properties comprising mixing particles of an ion-exchange resin with a water-insoluble polymeric material having film-forming character, the polymeric material being selected from the group consisting of addition polymers of a polymerizable monoethylenically unsaturated compound, alkyd resins, and polyurethanes, the ion-exchange resin being a cross-linked synthetic resin selected from the group consisting of organic condensation and addition polymers containing ion-exchange groups, and foaming the polymeric film-forming material into a cellular mass having attenuated walls of the polymeric material, in the surfaces of which the ion-exchange resin particles are embedded, the amount of said particles being from 20 to 150 parts by weight per 100 parts by weight of the aforesaid film-forming polymeric material.

13. A method of removing ions from a liquid comprising passing the liquid through an article comprising a coherent, self-supporting, foamed, intercommunicating-cell type mass of water-insoluble polymeric material in which the cells are of macroscopic size, the polymeric material being selected from the group consisting of addition polymers of a polymerizable monoethylenically unsaturated compound, alkyd resins, and polyurethanes, the mass containing particulate ion-exchange resin distributed in the walls between such cells, the ion-exchange resin being a cross-linked synthetic resin selected from the group consisting of organic condensation and addition polymers containing ion-exchange groups, the amount of such ion-exchange resin being from 20 to 150 parts by weight per 100 parts by weight of the first-mentioned polymeric material, said article having a density of not over 20 pounds per cubic foot and being permeable to both gases and liquids, whereby the ion-exchange resin is readily available to liquids introduced into the mass.

14. A method of removing ions from a liquid comprising disposing within a body of the liquid an article comprising a coherent, self-supporting, foamed intercommunicating-cell type mass of water-insoluble polymeric material, in which the cells are of macroscopic size, the mass containing particulate ion-exchange resin distributed in the walls between such cells, the ion-exchange resin being a cross-linked synthetic resin selected from the group consisting of organic condensation and addition polymers containing ion-exchange groups, the amount of such ion-exchange resin being from 20 to 150 parts by weight per 100 parts by weight of the first mentioned polymeric material, said article being flexible, resilient, and having a density of not over 20 pounds per cubic foot and being permeable to both gases and liquids, whereby the ion-exchange resin is readily available to liquids introduced into the mass, and alternately compressing and releasing the compression on the article within the liquid whereby the liquid is repeatedly passed through the passages of said article to effect intimate contact between the liquid and the ion-exchange particles in the article.

References Cited in the file of this patent

UNITED STATES PATENTS

| | | |
|---|---|---|
| 2,608,536 | Sterling | Aug. 26, 1952 |
| 2,634,244 | Simon | Apr. 7, 1953 |

FOREIGN PATENTS

| | | |
|---|---|---|
| 510,243 | Great Britain | July 28, 1939 |
| 731,071 | Great Britain | June 1, 1955 |